US011111016B1

(12) United States Patent
Pachikov et al.

(10) Patent No.: US 11,111,016 B1
(45) Date of Patent: Sep. 7, 2021

(54) MULTICOPTER THREE-PHASE PRECISION AUTO-LANDING

(71) Applicant: Sunflower Labs Inc., San Carlos, CA (US)

(72) Inventors: Alexander S. Pachikov, San Carlos, CA (US); Christian Eheim, Fällanden (CH); Nicolas de Palezieux, Zurich (CH)

(73) Assignee: Sunflower Labs Inc., San Carlos, CA (US)

( * ) Notice: Subject to any disclaimer, the term of this patent is extended or adjusted under 35 U.S.C. 154(b) by 419 days.

(21) Appl. No.: 16/025,393

(22) Filed: Jul. 2, 2018

Related U.S. Application Data

(60) Provisional application No. 62/539,830, filed on Aug. 1, 2017.

(51) Int. Cl.
| | |
|---|---|
| *G01S 1/70* | (2006.01) |
| *B64C 39/02* | (2006.01) |
| *B64F 1/20* | (2006.01) |
| *B64F 1/12* | (2006.01) |
| *G01S 19/40* | (2010.01) |
| *B64F 1/36* | (2017.01) |
| *H02J 7/00* | (2006.01) |

(52) U.S. Cl.
CPC .............. *B64C 39/024* (2013.01); *B64F 1/12* (2013.01); *B64F 1/20* (2013.01); *B64F 1/362* (2013.01); *G01S 1/70* (2013.01); *G01S 19/40* (2013.01); *B64C 2201/18* (2013.01); *H02J 7/0045* (2013.01)

(58) Field of Classification Search
CPC ... B64C 39/024; B64C 2201/18; B64F 1/362; B64F 1/20; B64F 1/12; G01S 1/70; G01S 19/40; H02J 7/0045
See application file for complete search history.

(56) References Cited

U.S. PATENT DOCUMENTS

| | | | |
|---|---|---|---|
| 9,139,310 B1 * | 9/2015 | Wang | B64F 1/36 |
| 9,387,928 B1 * | 7/2016 | Gentry | G08G 5/0052 |
| 9,862,504 B1 * | 1/2018 | Pounds | B64G 1/646 |
| 10,633,115 B2 * | 4/2020 | Pilskalns | B64F 1/007 |
| 2016/0200438 A1 * | 7/2016 | Bokeno | B60L 53/53 |
| | | | 244/2 |

(Continued)

*Primary Examiner* — Brian M O'Hara
*Assistant Examiner* — Keith L Dixon
(74) *Attorney, Agent, or Firm* — Muirhead and Saturnelli, LLC

(57) ABSTRACT

A multicopter landing platform includes a base portion, a bottom portion, disposed in the base portion, that accepts a protruding portion of the multicopter, and walls of the base portion that are sloped toward the bottom portion. The walls of the base portion may form a conic-shape. The multicopter landing platform may also include a GPS device that sends RTK corrections to a different GPS device on the multicopter. The multicopter landing platform may also include a beacon that guides the multicopter to cause the multicopter to contact the walls of the base station. The beacon may be disposed in the bottom portion. The beacon may provide a signal that is detected by the multicopter. The beacon may provide a light signal that is detected by a camera on the multicopter to guide the multicopter toward the base portion. A charging ring may be disposed in the bottom portion.

21 Claims, 4 Drawing Sheets

(56) References Cited

U.S. PATENT DOCUMENTS

| | | | |
|---|---|---|---|
| 2018/0141682 A1* | 5/2018 | Blake | B64F 1/22 |
| 2018/0237161 A1* | 8/2018 | Minnick | B60L 53/14 |
| 2019/0055018 A1* | 2/2019 | Bei | B64C 39/024 |
| 2019/0375504 A1* | 12/2019 | Schmalzried | B64D 1/22 |

* cited by examiner

MULTICOPTER THREE-PHASE PRECISION AUTO-LANDING

CROSS-REFERENCE TO RELATED APPLICATIONS

This application claims priority to U.S. Prov. App. No. 62/539,830, filed on Aug. 1, 2017, and entitled "MULTICOPTER THREE-PHASE PRECISION AUTO-LANDING", which is incorporated herein by reference.

TECHNICAL FIELD

This application is directed to the field of hardware and software design of multicopters for residential security systems, and more particularly to precision auto-landing of a multicopter on a landing platform.

BACKGROUND OF THE INVENTION

Following the creation by the FAA of a regulatory framework for consumer and commercial drones, US drone (multicopter) market is growing at an accelerated pace. The FAA projects shipments of hobbyist multicopters to increase 3.2 times from 1.10 million units in 2016 to 3.55 million units in 2021, while US shipments of commercial multicopters are expected to grow ten times from forty thousand units in 2016 to 420 thousand units in 2021. According to Gartner forecasts, global market revenue from multicopters will grow from $6 billion in 2017 to $11.2 billion by 2020. Major application areas for multicopters are evolving in industrial inspections, agriculture, mapping surveillance, modeling, delivery, security, etc.

The market for home security systems is growing at an accelerated pace, driven by increased concerns about general and residential security. By 2020, the global market for electronic security systems is expected to reach $80 billion, while market size for home security systems is projected to increase by approximately nine percent per year from less than $30 billion in 2015 to reach $47.5 billion in 2020. Some analysts forecast that the size of the home security solutions market alone will reach $74.3 billion by 2025. North America represents the largest part of the market. With approximately 76 million free-standing, single family homes in the US, where almost 56 millions of those are residing in lightly populated areas, outside of city centers and dense urban environments, only 30% of the free-standing homes currently have any kind of a home security system. These market conditions, along with advances in multicopter technologies, justify a new type of home security systems based on sensor networks and employing multicopters, such as systems developed by Sunflower Labs Inc.

An important aspect of efficient multicopter design and exploitation is safe multicopter landing. Hard landing or loss of control over landing may cause serious damage both to the multicopter and to the environment and, potentially, to livestock and people. This would be especially damaging for systems deployed on a private property, such as home security systems utilizing multicopters. Additionally, multicopters with a camera mounted in the bottom part may suffer broken or scratched camera lenses; rotors may suffer from tall grass and pebble strikes; dirt may be blown through motor bearings and cause premature motor failure, etc.

In order to make multicopter landing safer, a few models of landing pads are available from multicopter manufacturers, standalone companies and do-it-yourself flavors. For the most part, these pads are essentially nothing but safe landing spots unfolded over a desired random landing place. Such landing pads may address basic landing safety concerns but are short-term solutions lacking many important features, for example, long-term protection for a stationary multicopter that resides outdoors and is periodically flying on its assignments (a typical situation for home security systems and other field applications of multicopters). In addition, these rudimentary landing pad solutions are lacking charging capabilities.

A complete landing solution for drones, a landing platform, is a stationary or mobile device capable of protecting a drone at the landing phase while providing a long-term drone home with charging, weather protection and other features. New models of landing platforms, such as offered by HiveUAV, H3 Dynamics or Skysense (charging pad) are relatively expensive products and are often more compact than landing pads. Their size and construction make precise drone landing both a requirement and a challenge, taking into account increased turbulence of air currents near the surface that impede smooth landing.

Accordingly, it is desirable to develop a safe and efficient landing process for compact full-feature landing platforms.

SUMMARY OF THE INVENTION

According to the system described herein, a multicopter landing platform includes a base portion, a bottom portion, disposed in the base portion, that accepts a protruding portion of the multicopter, and walls of the base portion that are sloped toward the bottom portion. The walls of the base portion may form a conic-shape. The multicopter landing platform may also include a GPS device that sends RTK corrections to a different GPS device on the multicopter. The multicopter landing platform may also include a beacon that guides the multicopter to cause the multicopter to contact the walls of the base station. The beacon may be disposed in the bottom portion. The beacon may provide a signal that is detected by the multicopter. The beacon may provide a light signal that is detected by a camera on the multicopter to guide the multicopter toward the base portion. The walls of the base portion may cause the multicopter to move toward the bottom portion of the base portion after the multicopter initially contacts the walls of the base portion. A bitangent line that touches two outermost points of the multicopter may not cross any propellers or propeller enclosures of the multicopter. The bitangent line may have an angle that is slightly different from an angle of the walls of the base portion when the multicopter is in an upright position. The angle of the walls of the base portion, measured from a horizontal plane, may be greater than or equal to the angle of the bitangent line measured from the horizontal plane. A difference between the angles may be between zero and five degrees. The multicopter landing platform may also include a charging mechanism that charges the multicopter when the protruding portion of the multicopter is disposed in the bottom portion. A charging ring may be disposed in the bottom portion. The charging ring may include separate cathode and anode semi-rings and the multicopter may connect to the charging ring using pogo pins.

According further to the system described herein, landing a multicopter on a landing platform includes causing the multicopter to touch a portion of a sloped wall of the landing platform and, following the multicopter touching the portion of the sloped wall of the landing platform, the multicopter sliding along the sloped wall in a downward direction toward a bottom portion of the landing platform that accepts a protruding portion of the multicopter. Causing the multicopter to touch the portion of the sloped wall of the landing platform may include guiding the multicopter towards the landing platform. Causing the multicopter to touch the portion of the sloped wall of the landing platform may include guiding the multicopter towards the landing platform using a beacon provided in the landing platform that is detected by the multicopter. The beacon may provide a light signal that is detected by a camera on the multicopter to guide the multicopter toward the base portion. A bitangent line that touches two outermost points of the multicopter may not cross any propeller or propeller enclosures of the multicopter. The bitangent line may have an angle that is slightly different from an angle of the walls of the base portion when the multicopter is in an upright position. The angle of the walls of the base portion, measured from a horizontal plane, may be greater than or equal to the angle of the bitangent line measured from the horizontal plane. A difference between the angles may be between zero and five degrees.

According further to the system described herein, a non-transitory computer readable medium contains software that lands a multicopter on a landing platform. The software includes executable code that causes the multicopter to touch a portion of a sloped wall of the landing platform and executable code that causes the multicopter to slide along the sloped wall in a downward direction toward a bottom portion of the landing platform that accepts a protruding portion of the multicopter following the multicopter touching the portion of the sloped wall of the landing platform. Causing the multicopter to touch the portion of the sloped wall of the landing platform may include guiding the multicopter towards the landing platform. Causing the multicopter to touch the portion of the sloped wall of the landing platform may include guiding the multicopter towards the landing platform using a beacon provided in the landing platform that is detected by the multicopter. The beacon may provide a light signal that is detected by a camera on the multicopter to guide the multicopter toward the base portion. A bitangent line that touches two outermost points of the multicopter may not cross any propeller or propeller enclosures of the multicopter. The bitangent line may have an angle that is slightly different from an angle of the walls of the base portion when the multicopter is in an upright position. The angle of the walls of the base portion, measured from a horizontal plane, may be greater than or equal to the angle of the bitangent line measured from the horizontal plane. A difference between the angles may be between zero and five degrees.

The proposed system secures precision auto-landing of a multicopter on a landing platform through a special funnel construction of the landing platform and a three-phase landing routine, whereby during the first phase the multicopter is positioned roughly above the landing platform at an altitude of approximately 2 m to 10 m above ground level (AGL) controlled by GPS receivers on the multicopter and on the landing platform until a beacon tracker of the multicopter identifies a beacon located at the landing platform. The GPS receivers communicate to determine relative positions of the multicopter and the landing platform. During the next phase, the multicopter is driven closer to the landing guided by the beacon and the tracker. During the final phase, the multicopter touches the funnel-shaped platform with a conic bottom of the multicopter and one or two bottom parts of motor compartments of the multicopter and slides down a specially designed conic funnel of the landing platform, driven by the force of gravity and by a slope of the funnel until the multicopter reaches a final landing position where the multicopter rests securely and may be charged.

As explained above, several companies, such as Sunflower Labs Inc., are exploring new designs of multi-sensor home security systems where autonomous camera vehicles, including multicopters, may reside within the perimeter of property of an owner and may be routed automatically or under supervision of an owner for video recording and real-time inspections of unusual activities or potential intrusion of the property detected by sensors.

Multicopters residing on the property may fly from a designated point and may be docked on a landing platform, enjoying the advantages of immediate charging, simplified routing with a known origin and protection from hazards and bad weather.

The need for controlled precision landing of multicopters on landing platforms comes from precise positioning needed for autonomously charging the battery and securely resting on the landing platform. Also, increased air turbulence near the ground surface, which creates various risks for the equipment and the process, is circumvented by the proposed solution.

For this purpose, the system may employ a multicopter with a cone-shaped bottom part and a landing platform with a funnel-shaped interior designed in such manner that the multicopter may slide (while still being stabilized by the flight controller) within a cone-shaped funnel touching a slope of the cone-shaped funnel in two or three points and keeping the multicopter close to an upright position. A lower touch point during such sliding is on a bottom part of the multicopter, whereas one or two upper touch points are near a bottom of one or two motor compartments mounted below each propeller (see FIG. 3A). An important parameter of this touch configuration is a characteristic chord—a bitangent to the multicopter cross-section through the touching points; a corresponding straight line does not cross any propeller enclosures, thus ensuring that, if a multicopter slides over a funnel of a landing station, the multicopter would normally touch the funnel slope in designated touch points and there is a minimal risk of damaging the propellers or flipping the multicopter.

A funnel-shaped receiving part of the landing platform has the shape of a truncated cone with an opening at a bottom portion of the receiving part where a bottom portion of the multicopter at rest in a final landing position meets the charger and enables recharging the multicopter. In particular, a multicopter charger may be a charging ring, potentially split into cathode and anode semi-rings. The multicopter may have pogo pins at a bottom of a motor compartment of the multicopter, activating the charging process when the pogo pins touch the charging ring, which corresponds to a bottom position of the multicopter on the landing platform. An angle of a slope of the receiving part to the horizon may be slightly higher than an angle of a characteristic chord to the horizon; this provides for a nearly upright position of the multicopter when the multicopter is sliding toward a final landing position, causing the multicopter to fly inward (towards the center of the funnel shaped receiving part) until corrected by an attitude controller on the multicopter.

The landing process can be described as follows:
  Phase 1. A landing platform is equipped with a GPS or RTK GPS receiver; the multicopter also has an onboard GPS receiver (or an RTK GPS receiver aided by the landing platform RTK GPS). Guided by the pair of GPS receivers, the multicopter positions itself above the platform at a point (for example, 2-10 m altitude AGL) where the multicopter may enter a next intermediate phase of precision landing, such as guided by a beacon on the platform. Such an intermediate phase may be necessitated by imprecision of GPS technology, which may not be able to guide the multicopter to accurately touch the landing platform.

Phase 2. After the multicopter is positioned roughly above the platform at a required altitude using the onboard GPS receiver, landing phase 2 may be initiated, during which the multicopter vertically approaches the platform while correcting lateral position of the multicopter guided by a beacon located at the platform or guided by other high precision technology. Possible solutions may include a beam of light (visible or IR) emanating from the beacon on the platform and captured by a camera at the bottom of a multicopter; a radar-based solution; etc. As an example, during this phase, guidance corrections may be computed based on image analysis of a downward facing camera of the multicopter, which is tuned to recognize a light beacon from the landing platform. Using this mechanism, the multicopter may continue descending until a cone-shaped bottom part of the multicopter touches an inside wall of a funnel-shaped landing platform.

Phase 3. After being guided during phase 2 down to a point where the multicopter touches the landing platform, at landing phase 3, the multicopter is physically guided into an exact desired final landing position. To accomplish this, the landing platform has a funnel shape (or similar), as explained elsewhere herein, with a wall angle close to or the same as an angle of a characteristic chord (described elsewhere herein) when the multicopter is in an upright position. The difference between the angles may be between zero degrees and five degrees. When a wall angle of an open part of the funnel-shaped landing part is slightly smaller than an angle of the characteristic chord (both angles are measured to the horizontal plane), the multicopter may be forced to stay nearly upright when the multicopter touches the wall. In an embodiment, a small inward tilt, for example, five degrees, makes the multicopter fly towards a center portion of the funnel until corrected by an attitude controller on the multicopter when the multicopter nearly reaches a final position where the multicopter is positioned for rest and charging. Essentially, at Phase 3, the multicopter slides down the funnel-shaped landing part, touching a wall of the funnel-shaped landing part along extreme points of the characteristic chord until the multicopter reaches the final position, corrected close to the final position by the attitude controller.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a design, control systems and processes for a combination of a multicopter and a landing platform securing a three-phase, automatic precision auto-landing of the multicopter on the platform where the multicopter may rest between deployments and may be recharged.

Figure 1:
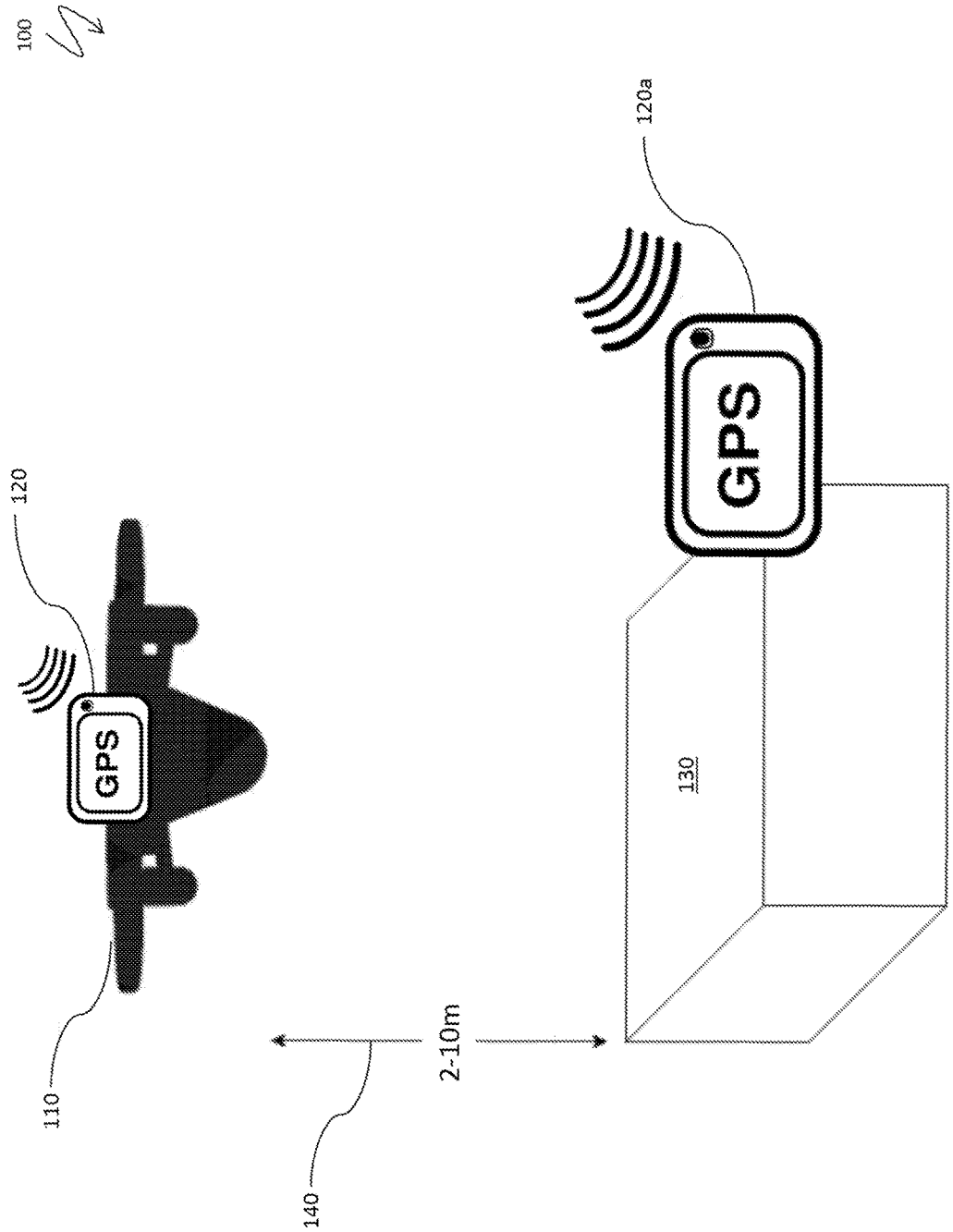
FIG. 1 is a schematic illustration of a GPS controlled phase of landing, according to an embodiment of the system described herein.

FIG. 1 is a schematic illustration of 100 of a GPS controlled phase of landing (Phase 1, explained elsewhere herein). A multicopter 110 with a GPS receiver 120 approaches a landing platform 130, equipped with a GPS receiver 120a. Guided by the GPS receivers 120, 120a, the multicopter 110 is positioned above the platform at a height 140 (here, at a height >2 m altitude AGL).

Figure 2:
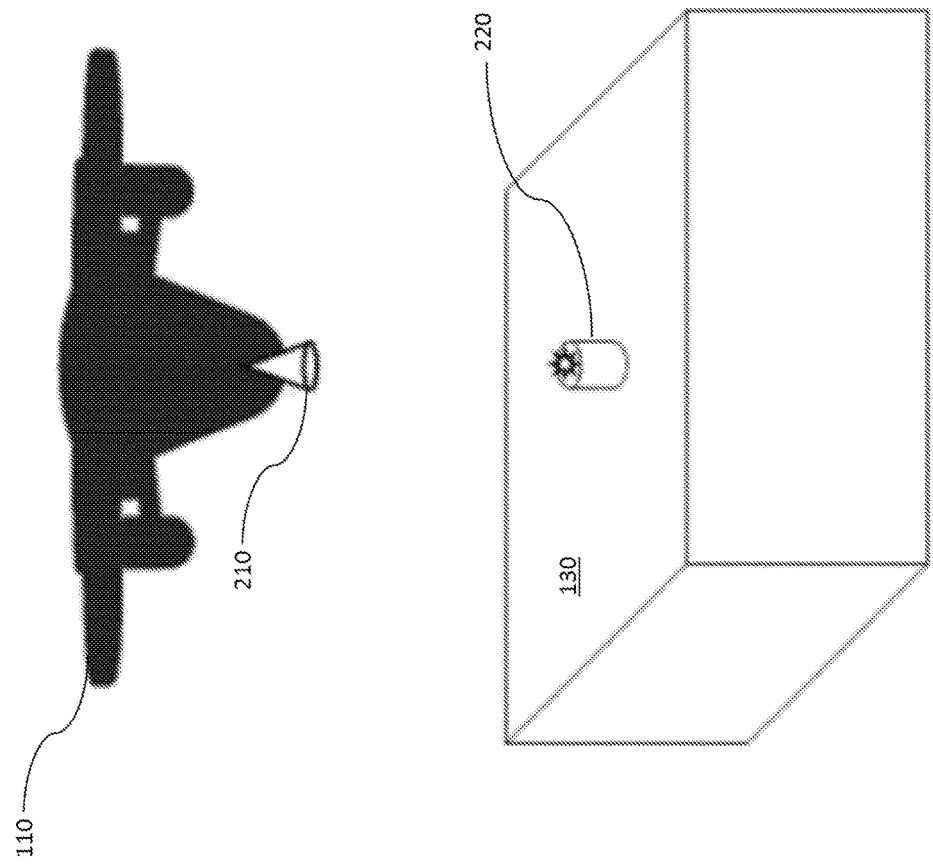
FIG. 2 is a schematic illustration of a beacon and camera controlled phase of landing, according to an embodiment of the system described herein.

FIG. 2 is a schematic illustration 200 of a beacon and camera controlled phase of landing (Phase 2, explained elsewhere herein). Upon positioning the multicopter 110 at a sufficiently low height over the landing platform 130, the multicopter 110 is capable of capturing with a camera 210 a signal (in FIG. 2, a beam of light, as explained elsewhere herein) of a beacon 220, installed at the platform 130. Accordingly, Phase 2 of descent of the multicopter 110 is based on processing images captured by the camera 210 used for guidance corrections. Phase 2 ends when a bottom surface of the multicopter touches a funnel-shaped portion of the landing platform, as explained in subsequent FIGS. 3A-3B.

Figure 3A:
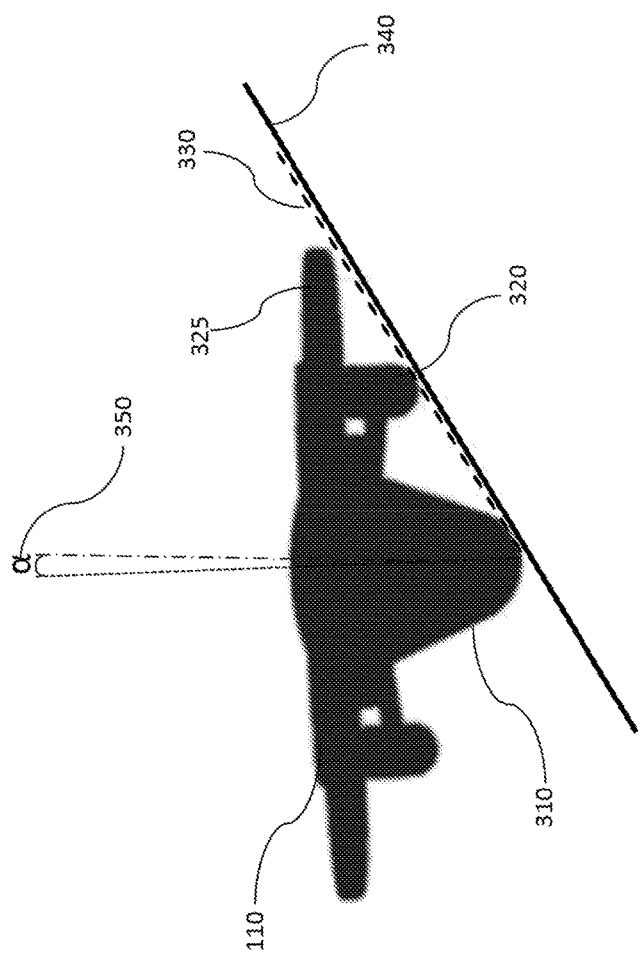
FIGS. 3A-3B are schematic illustrations of gravity and slope controlled landing phase and a bottom position of a multicopter at rest, according to an embodiment of the system described herein.
Figure 3B:
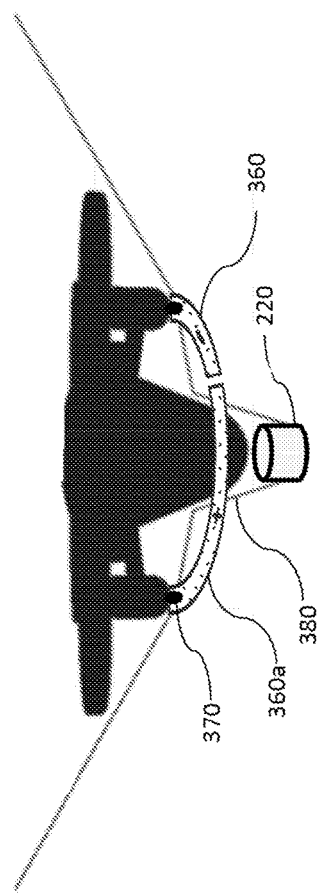

FIGS. 3A-3B are schematic illustrations of a gravity and slope controlled landing phase and a bottom position of the multicopter at rest.

FIG. 3A is a schematic illustration of gravity and slope controlled landing phase (Phase 3) of the multicopter 110. A conic-shaped bottom portion 310 and a protruding portion corresponding to a bottom portion of a motor compartment 320 of the multicopter 110 are shown as connected for illustration purposes by a dashed line of a characteristic chord 330 (explained elsewhere herein) formed by a bitangent line that touches two outermost points of the multicopter 110 and does not cross any propeller enclosures 325 of the multicopter 110. The characteristic chord 330 coincides with a slope (inner wall 340) of the funnel-shaped portion, representing an interior part of the landing platform (item 130 in FIGS. 1 and 2). The configuration shown in FIG. 3A represents an intermediate position of the multicopter 110, which has touched the slope and slides along the slope contacting a surface of the multicopter 110 with two points (on a bottom conic-shaped part of the multicopter 110 and the bottom portion of the motor compartment 320, connected with the characteristic chord 330. In an embodiment, there may be a slight inward tilt 350 of a vertical axis of the multicopter 110, securing a stable gravitational descent towards the bottom of the funnel.

FIG. 3B is a schematic illustration of a bottom position of the multicopter at rest. At a bottom portion of the slope, a charging ring 360 (split into cathode and anode semi-rings, as illustrated by a semi-ring 360a) secures, along with potential vertical correction using rotors of the multicopter, a stable final position of the multicopter 110 at a bottom portion 380 of the funnel proximal to where the multicopter 110 may contact the charging ring 360 with pogo pins 370 and may immediately start charging while resting above the beacon 220 (see FIG. 2 for details about the beacon 220). Note that, generally, the bottom portion 380 may be provided in any appropriate shape that accepts a protruding member of the multicopter 110 and may be provided, essentially, as an opening.

Figure 4:
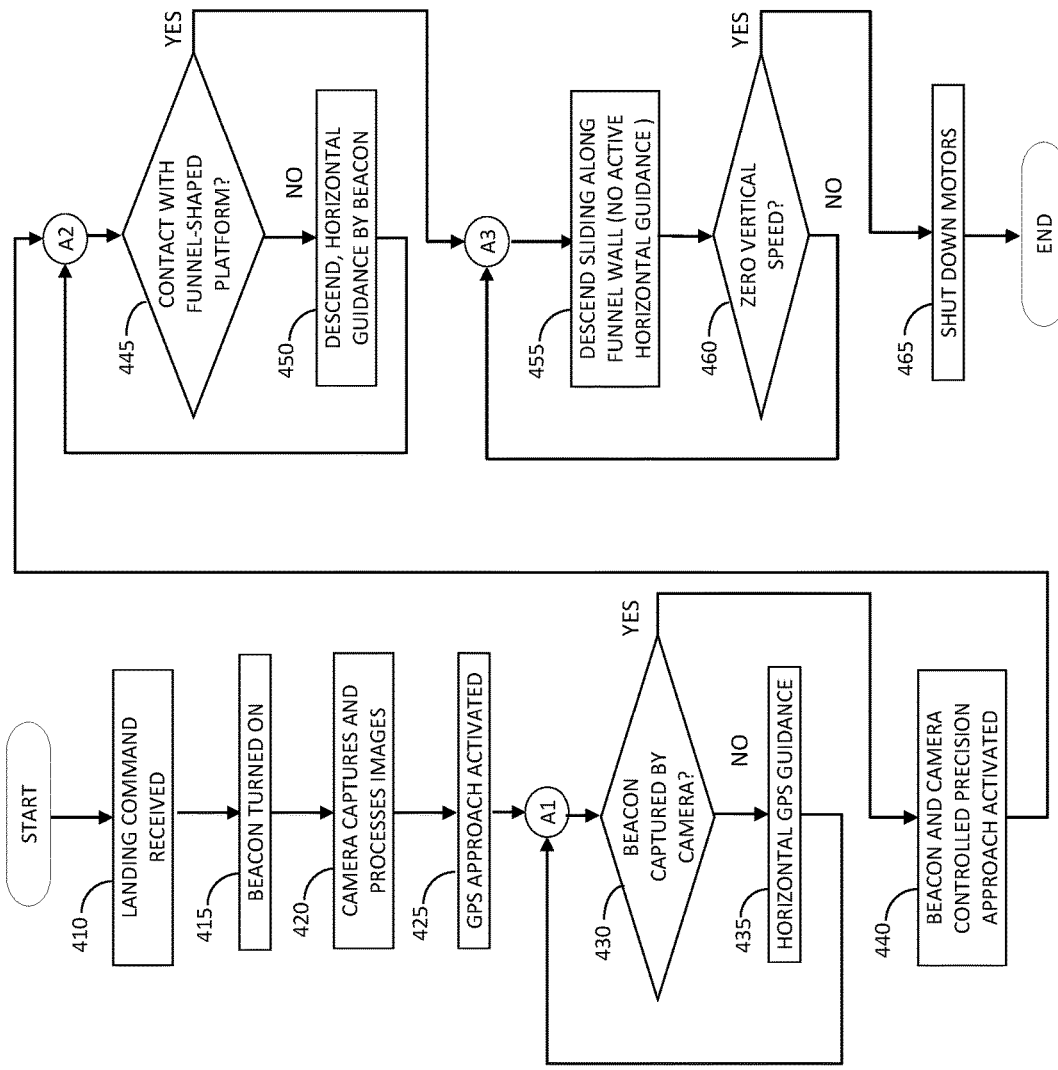
FIG. 4 is a system flow diagram illustrating system functioning in connection with multicopter approach and precision landing, according to an embodiment of the system described herein.

Referring to FIG. 4, a system flow diagram 400 illustrates processing in connection with the multicopter 110 approaching and landing. Processing begins at a step 410, where a landing command is received. After the step 410, processing proceeds to a step 415, where the beacon 220 on the landing platform is turned on. After the step 415, processing proceeds to a step 420, where the camera 210 in a bottom part of the multicopter 110 captures and processes images of the platform (note that a height of the multicopter 110 may still be too great to reliably process images for a precision landing and capture the light beam emanated by the beacon, which may also depend on weather conditions). After the step 420, processing proceeds to a step 425, where GPS approach is activated. After the step 425, processing proceeds to a test step 430, where it is determined whether the beam from the beacon has been captured by the multicopter camera. If not, processing proceeds to a step 435, where a horizontal GPS guidance is performed to correct multicopter position. After the step 435, processing proceeds back to the test step 430, which may be independently reached from the step 425.

If it was determined at the test step 430 that the beam emanated by the beacon has been captured by the multicopter camera, processing proceeds to a step 440, where the beacon and camera controlled precision landing is activated (Phase 2, explained, for example, in FIG. 2 and the accompanying text). After the step 440, processing proceeds to a test step 445, where it is determined whether the multicopter has contacted with the funnel-shaped platform. If not, processing proceeds to a step 450, where the descent with a horizontal guidance by the beacon continues. After the step 450, processing proceeds back to the test step 445, which may be independently reached from the step 440.

If it was determined at the test step 445 that the multicopter has contacted with the funnel-shaped landing platform, processing proceeds to a step 455, where the multicopter descends sliding along the funnel wall, in which case active horizontal guidance may not be provided. After the step 455, processing proceeds to a test step 460, where it is determined whether the multicopter has stopped descending (zero vertical speed). If not, processing proceeds back to the step 455, which may be independently reached from the test step 445. If it is determined at the step 460 that the multicopter has stopped descending, processing proceeds to a step 465 where multicopter motors are shut down. After the step 465, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations, tracking mechanisms and decisions may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A landing platform for a multicopter, comprising:
a base portion;
walls of the base portion formed in a cone to cause the multicopter to slide inside the cone using gravity prior to coming to a resting position; and
an opening at a smaller end of the cone that engages a protruding portion of the multicopter to bring the multicopter to a resting position, wherein the protruding portion slides on the walls of the base portion prior to engaging the opening and wherein any bitangent line formed between an outermost point of the multicopter and points where the multicopter touches the walls of the base portion does not cross a propeller enclosure of the multicopter.

2. A landing platform, according to claim 1, further comprising:
a GPS device that sends corrections to a different GPS device on the multicopter.

3. A landing platform, according to claim 1, further comprising:
a beacon that guides the multicopter to cause the multicopter to contact the walls of the base portion.

4. A landing platform, according to claim 3, wherein the beacon is disposed in the opening.

5. A landing platform, according to claim 4, wherein the beacon provides a signal that is detected by the multicopter.

6. A landing platform, according to claim 5, wherein the beacon provides a light signal that is detected by a camera on the multicopter to guide the multicopter toward the base portion.

7. A landing platform, according to claim 1, wherein a bitangent line in a vertical cross-section of the multicopter when the multicopter is in an upright position has an angle, measured from a horizontal plane, that is slightly different from an angle of the walls of the base portion, measured from the horizontal plane.

8. A landing platform, according to claim 7, wherein the angle of the walls of the base portion is greater than the angle of the bitangent line.

9. A landing platform, according to claim 8, wherein a difference between the angles is between zero and five degrees.

10. A landing platform, according to claim 1, further comprising:
a charging mechanism that charges the multicopter when the protruding portion of the multicopter is disposed in the opening.

11. A landing platform, according to claim 10, wherein a charging ring is disposed in the opening.

12. A landing platform, according to claim 11, wherein the charging ring includes separate cathode and anode semi-rings and the multicopter connects to the charging ring using pogo pins.

13. A method of landing a multicopter on a landing platform, comprising:
- causing the multicopter to touch a portion of a sloped wall of the landing platform, wherein the sloped wall is formed in a cone;
- following the multicopter touching the portion of the sloped wall of the landing platform, the multicopter sliding along the sloped wall in a downward direction using gravity toward an opening formed in the landing platform at a smaller end of the cone that engages a protruding portion of the multicopter to bring the multicopter to a resting position, wherein any bitangent line formed between an outermost point of the multicopter and points where the multicopter touches the walls of the base portion does not cross a propeller enclosure of the multicopter; and
- following the multicopter sliding along the sloped wall, the protruding portion of the multicopter engaging the opening to bring the multicopter to a resting position.

14. A method of landing a multicopter, according to claim 13, wherein causing the multicopter to touch the portion of the sloped wall of the landing platform includes guiding the multicopter towards the landing platform.

15. A method of landing a multicopter, according to claim 13, wherein causing the multicopter to touch the portion of the sloped wall of the landing platform includes guiding the multicopter towards the landing platform using a beacon provided in the landing platform that is detected by the multicopter.

16. A method of landing a multicopter, according to claim 15, wherein the beacon provides a light signal that is detected by a camera on the multicopter to guide the multicopter toward the base portion.

17. A method of landing a multicopter, according to claim 13, wherein any possible bitangent line that touches two outermost points of the multicopter does not cross any propeller or propeller enclosures of the multicopter.

18. A method of landing a multicopter, according to claim 13, wherein a bitangent line in a vertical cross-section of the multicopter when the multicopter is in an upright position has an angle, measured from a horizontal plane, that is slightly different from an angle of the walls of the base portion, measured from the horizontal plane.

19. A method of landing a multicopter, according to claim 18, wherein the angle of the walls of the base portion is greater than the angle of the bitangent line.

20. A method of landing a multicopter, according to claim 19, wherein a difference between the angles is between zero and five degrees.

21. A non-transitory computer readable medium containing software that lands a multicopter on a landing platform, the software comprising:
- executable code that causes the multicopter to touch a portion of a sloped wall of the landing platform, wherein the sloped wall is formed in a cone; and
- executable code that causes the multicopter to slide along the sloped wall in a downward direction using gravity toward an opening formed in the landing platform at a smaller end of the cone that engages a protruding portion of the multicopter following the multicopter touching the portion of the sloped wall of the landing platform, wherein the protruding portion of the multicopter engages the opening to bring the multicopter to a resting position and wherein any bitangent line formed between an outermost point of the multicopter and points where the multicopter touches the walls of the base portion does not cross a propeller enclosure of the multicopter.

* * * * *